United States Patent
Chen et al.

(10) Patent No.: US 11,627,530 B2
(45) Date of Patent: Apr. 11, 2023

(54) REDUCING POWER CONSUMPTION OF A TERMINAL DEVICE IN WHICH THE TERMINAL DEVICE DISCOVERS OR MEASURES A NETWORK DEVICE

(71) Applicant: HUAWEI TECHNOLOGIES CO., LTD., Shenzhen (CN)

(72) Inventors: Lei Chen, Shenzhen (CN); Fengwei Liu, Chengdu (CN); Jing Qiu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 253 days.

(21) Appl. No.: 16/942,664

(22) Filed: Jul. 29, 2020

(65) Prior Publication Data

US 2020/0359321 A1  Nov. 12, 2020

Related U.S. Application Data

(63) Continuation of application No. PCT/CN2019/074930, filed on Feb. 13, 2019.

(30) Foreign Application Priority Data

Feb. 13, 2018 (CN) .......................... 201810148485.7

(51) Int. Cl.
*H04W 52/02* (2009.01)
*H04L 5/00* (2006.01)
*H04W 72/04* (2009.01)

(52) U.S. Cl.
CPC ....... *H04W 52/0229* (2013.01); *H04L 5/0007* (2013.01); *H04L 5/0048* (2013.01); *H04W 72/042* (2013.01)

(58) Field of Classification Search
CPC ............ H04W 52/0229; H04W 72/042; H04L 5/0048; H04L 5/0007; H04L 5/005; H04L 5/0051
See application file for complete search history.

(56) References Cited

U.S. PATENT DOCUMENTS

2015/0222401 A1* 8/2015 Xu ......................... H04W 8/005
370/329
2015/0245192 A1* 8/2015 Wu ......................... H04W 68/00
370/329

(Continued)

FOREIGN PATENT DOCUMENTS

CN  103581093 A  2/2014
CN  103686676 A  3/2014

(Continued)

OTHER PUBLICATIONS

Nokia et al, "SS block RSRP measurements", 3GPP TSG RAN WG1#89, R1-1708237, Hangzhou, P.R. China May 15-19, 2017, total 4 pages.

(Continued)

*Primary Examiner* — Ian N Moore
*Assistant Examiner* — Brian T Le
(74) *Attorney, Agent, or Firm* — Stein IP, LLC

(57) ABSTRACT

This application provides a signal transmission method and apparatus. The method includes: receiving, by a first device, configuration information sent by a third device and used to indicate a quantity of times for which the third device sends a signal group, in other words, learning in advance, based on the configuration information, a quantity of receive beams that can be measured, and selecting, after receiving first signals of the quantity an optimal receive beam from receive beams that have been detected, to avoid continuously detecting more first signals for selection.

20 Claims, 7 Drawing Sheets

(56) References Cited

U.S. PATENT DOCUMENTS

2017/0318551 A1    11/2017   Yasukawa et al.
2017/0331670 A1*   11/2017   Parkvall ............... H04B 7/0617

FOREIGN PATENT DOCUMENTS

| CN | 103686691 A   | 3/2014  |
|----|---------------|---------|
| CN | 103945497 A   | 7/2014  |
| CN | 104734760 A   | 6/2015  |
| CN | 105207752 A   | 12/2015 |
| CN | 105338518 A   | 2/2016  |
| WO | 2014187276 A1 | 11/2014 |

OTHER PUBLICATIONS

CMCC,"Discussion on SS block repetition transmission", 3GPP TSG RAN WG1 Meeting NR Ad-hoc#3, R1-1716043, Nagoya, Japan, Sep. 18-21, 2017, total 3 pages.

CATT,"Actually transmitted SS block and SS blocks in wideband", 3GPP TSG RAN WG1 Meeting 90bis , R1-1717797, Prague, CZ, Oct. 9-13, 2017, total 5 pages.

Huawei et al,"Remaining details of SRS design", 3GPP TSG RAN WG1 Meeting #91, R1-1719441, Reno, USA, Nov. 27-Dec. 1, 2017, total 12 pages.

* cited by examiner

REDUCING POWER CONSUMPTION OF A TERMINAL DEVICE IN WHICH THE TERMINAL DEVICE DISCOVERS OR MEASURES A NETWORK DEVICE

CROSS-REFERENCE TO RELATED APPLICATIONS

This application is a continuation of International Application No. PCT/CN2019/074930, filed on Feb. 13, 2019, which claims priority to Chinese Patent Application No. 201810148485.7, filed on Feb. 13, 2018, and the disclosures of the aforementioned applications are hereby incorporated by reference in their entireties.

TECHNICAL FIELD

This application relates to the communications field, and more specifically, to a signal transmission method and apparatus.

BACKGROUND

In new radio (NR), initial synchronization and cell discovery are implemented by using a synchronization signal/PBCH block (SSB) mechanism. Specifically, a network device completes scanning transmit beams within a cell coverage area by using each SSB in an SSB burst set, and a terminal device sequentially monitors each SSB, to determine a receive beam that can be scanned by the terminal device and that is aligned with each transmit beam that can be scanned by a serving network device, thereby implementing downlink synchronization.

In a conventional solution, to discover or measure a neighboring cell of a terminal device, a serving network device needs to send configuration information to the terminal device, to indicate the terminal device to discover or measure another network device that can provide a service for the terminal device. In this way, the terminal device can receive a downlink signal based on the configuration information. However, because the terminal device may include a plurality of receive beams, the terminal device can discover or measure only a network device that can periodically send signals for a long time. In other words, the terminal device can discover or measure another network device only by continuously detecting signals periodically sent by the network device. Consequently, power consumption of the terminal device is relatively high.

SUMMARY

Aspects of this application provide a signal transmission method and apparatus, to reduce power consumption of a terminal device in a scenario in which the terminal device discovers or measures a network device.

According to a first aspect, a signal transmission method is provided. The method includes: receiving, by a first device, configuration information sent by a second device, where the configuration information is used to indicate a quantity of times for which a third device sends a signal group, and the signal group includes at least one first signal; and receiving, by the first device based on the configuration information, the first signal sent by the third device.

The first device receives the configuration information that is sent by the third device and that is used to indicate the quantity of times for which the third device sends the signal group, in other words, learns in advance, based on the configuration information, a quantity of receive beams that can be measured, and selects, after receiving first signals of the quantity, an optimal receive beam from receive beams that have been detected, to avoid continuously detecting more first signals for selection, thereby reducing power consumption of the first device.

In some possible implementations, the configuration information includes at least one of the quantity of times for which the third device sends the signal group, a time at which the first signal group is sent, or a time at which the last signal group is sent.

The configuration information may directly indicate the quantity of times for which the third device sends the signal group, or may indirectly indicate the quantity of times for which the third device sends the signal group.

In some possible implementations, the first device receives the configuration information sent by the second device, where the configuration information is triggered based on a configuration request sent by the second device.

When the configuration information needs to be determined, the second device triggers the third device to determine the configuration information for the first device, thereby reducing resource overheads.

In some possible implementations, the method further includes: sending, by the first device, parameter information to the second device; and the receiving, by a first device, configuration information sent by a second device includes: receiving, by the first device, the configuration information, where the configuration information is determined based on the parameter information.

The configuration information received by the first device may be determined by the third device with reference to the parameter information that is reported by the first device and that is used for communication between the first device and the second device. For example, the third device may determine the parameter information as the configuration information, and specifically, the second device notifies the third device of a quantity that is of times for which a signal group is sent and that is in the parameter information, namely, a quantity of receive beams that can be scanned by the first device. Alternatively, the third device may set the quantity that is of times for which the signal group is sent and that is in the configuration information to be equal to the quantity that is of times for which the signal group is sent and that is in the parameter information. Therefore, the third device accurately determines a receive beam aligned with a transmit beam that can be scanned by the third device, thereby improving quality of communication between the first device and the third device.

In some possible implementations, the parameter information is used to indicate at least one of a time-frequency domain resource position occupied by the first signal, the quantity of times for which the third device sends the signal group, or a quantity of transmit beams corresponding to first signals.

The parameter information indicates at least one of the time-frequency domain resource position occupied by the first signal, the quantity of times for which the third device sends the signal group, or the quantity of transmit beams corresponding to the first signals. In this way, the third device can determine more appropriate configuration information based on the parameter information, thereby further improving the quality of communication between the first device and the third device.

In some possible implementations, the configuration information is used to indicate at least one of a quantity of first signals included in the signal group, the time-frequency domain resource position occupied by the first signal, or a periodicity in which the signal group is sent.

The configuration information indicates at least one of the quantity of first signals included in the signal group, the time-frequency domain resource position occupied by the first signal, or the periodicity in which the signal group is sent. In other words, the third device can accurately determine, based on the configuration information, a specific resource position in which the signal sent by the third device is received. Therefore, the quality of communication between the first device and the third device is improved.

In some possible implementations, the time-frequency domain resource position that is occupied by the first signal and that is indicated by the configuration information is different from a time-frequency domain resource position occupied by a second signal, and the second signal is a signal sent by the second device to a terminal device served by the second device.

When the first device is a network device, the third device separately and independently configures time-frequency resources for the first device and a terminal device served by the third device. In this way, when the first device receives the first signal sent on a time-frequency resource configured by the third device for the first device, and the terminal device receives the second signal sent on a time-frequency resource configured by the third device for the terminal device, no interference is generated, thereby further improving signal transmission quality.

In some possible implementations, the configuration information is further used to indicate a type of first signal, the type of first signal is a first type or a second type, a first signal of the first type includes a primary synchronization signal, a secondary synchronization signal, and a broadcast signal, and a first signal of the second type includes a primary synchronization signal and a secondary synchronization signal.

Content of the first signal is determined by using an indication of the configuration information, thereby reducing signaling overheads for transmitting the first signal.

In some possible implementations, when the type of first signal is the second type, the first signal occupies at least two time units on a time domain resource, and a time unit occupied by a primary synchronization signal in the first signal and a time unit occupied by a secondary synchronization signal in the first signal are consecutive time units in the at least two time units.

If the first signal is used only for synchronization between devices and cell identification, the signaling overheads can be reduced because the time units occupied by the primary synchronization signal and the secondary synchronization signal are consecutive.

According to a second aspect, a signal transmission method is provided. The method includes: obtaining, by a second device, configuration information, where the configuration information is used to indicate a quantity of times for which a signal group is sent, the signal group includes at least one first signal, and the first signal is used by a first device to discover or measure a third device; and sending, by the second device, the configuration information to the first device.

The second device obtains the configuration information used to indicate the quantity of times for which the third device sends the signal group, and sends the configuration information to the first device, so that the first device can receive, based on the configuration information, the first signal sent by the third device on an aligned beam, thereby improving signal transmission quality.

In some possible implementations, the method further includes: sending, by the second device, a configuration request to the third device; and the obtaining, by a second device, configuration information includes: receiving, by the second device, the configuration information sent by the third device, where the configuration information is triggered by using the configuration request.

When the configuration information needs to be determined, the second device triggers the third device to determine the configuration information for the first device, thereby reducing resource overheads.

In some possible implementations, the method further includes: receiving, by the second device, parameter information sent by the first device; and sending, by the second device, the parameter information to the third device; and the obtaining, by a second device, configuration information includes: receiving, by the second device, the configuration information sent by the third device, where the configuration information is determined based on the parameter information.

The second device receives the parameter information that is reported by the first device and that is used for communication between the first device and the second device, and sends the parameter information to the third device, so that the third device determines the configuration information based on the parameter information. In this way, the third device determines more appropriate configuration information, thereby improving quality of communication between the first device and the third device.

In some possible implementations, the parameter information is used to indicate at least one of a time-frequency domain resource position occupied by the first signal, the quantity of times for which the third device sends the signal group, or a quantity of transmit beams corresponding to first signals.

The parameter information indicates at least one of the time-frequency domain resource position occupied by the first signal, the quantity of times for which the third device sends the signal group, or the quantity of transmit beams corresponding to the first signals. In this way, the third device can determine more appropriate configuration information based on the parameter information, thereby further improving the quality of communication between the first device and the third device.

In some possible implementations, the configuration information is used to indicate at least one of a quantity of first signals included in the signal group, the time-frequency domain resource position occupied by the first signal, or a periodicity in which the signal group is sent.

The configuration information indicates at least one of the quantity of first signals included in the signal group, the time-frequency domain resource position occupied by the first signal, or the periodicity in which the signal group is sent, thereby improving the quality of communication between the first device and the third device.

In some possible implementations, the time-frequency domain resource position that is occupied by the first signal and that is indicated by the configuration information is different from a time-frequency domain resource position occupied by a second signal, and the second signal is a signal sent by the third device to a terminal device served by the third device.

When the first device is a network device, the third device may separately and independently configure time-frequency resources for the first device and the terminal device served by the third device. In this way, when the third device sends the second signal on a time-frequency resource configured for the terminal device, and the third device sends the first signal on a time-frequency resource configured for the first device, no interference is generated, thereby further improving signal transmission quality.

In some possible implementations, the configuration information is further used to indicate a type of first signal, the type of first signal is a first type or a second type, a first signal of the first type includes a primary synchronization signal, a secondary synchronization signal, and a broadcast signal, and a first signal of the second type includes a primary synchronization signal and a secondary synchronization signal.

Content of the first signal is determined by using an indication of the configuration information, thereby reducing signaling overheads for transmitting the first signal.

In some possible implementations, when the type of first signal is the second type, the first signal occupies at least two time units on a time domain resource, and a time unit occupied by a primary synchronization signal in the first signal and a time unit occupied by a secondary synchronization signal in the first signal are consecutive time units in the at least two time units.

If the first signal is used only for synchronization between devices and cell identification, the signaling overheads can be reduced because the time units occupied by the primary synchronization signal and the secondary synchronization signal are consecutive.

According to a third aspect, a signal transmission method is provided. The method includes: determining, by a third device, configuration information, where the configuration information is used to indicate a quantity of times for which the third device sends a signal group, and the signal group includes at least one first signal; sending, by the third device, the configuration information to a second device, where the second device is a device that currently provides a service for a first device; and sending, by the third device, the first signal to the first device.

The third device determines the configuration information used to indicate the quantity of times for which the third device sends the signal group, and sends the configuration information to the first device via the second device, so that the first device can receive, based on the configuration information, the first signal sent by the third device on an aligned beam, thereby improving signal transmission quality.

In some possible implementations, the method further includes: receiving, by the third device, a configuration request; and the sending, by the third device, the configuration information to a second device includes: sending, by the third device, the configuration information based on the configuration request.

In some possible implementations, the method further includes: receiving, by the third device, parameter information; and the determining, by a third device, configuration information includes: determining, by the third device, the configuration information based on the parameter information.

In some possible implementations, the parameter information is used to indicate at least one of a time-frequency domain resource position occupied by the first signal, the quantity of times for which the third device sends the signal group, or a quantity of transmit beams corresponding to first signals.

In some possible implementations, the configuration information is used to indicate at least one of a quantity of first signals included in the signal group, the time-frequency domain resource position occupied by the first signal, or a periodicity in which the signal group is sent.

In some possible implementations, the time-frequency domain resource position that is occupied by the first signal and that is indicated by the configuration information is different from a time-frequency domain resource position occupied by a second signal, and the second signal is a signal sent by the third device to a terminal device served by the third device.

In some possible implementations, the configuration information is further used to indicate a type of first signal, the type of first signal is a first type or a second type, a first signal of the first type includes a primary synchronization signal, a secondary synchronization signal, and a broadcast signal, and a first signal of the second type includes a primary synchronization signal and a secondary synchronization signal.

In some possible implementations, when the type of first signal is the second type, the first signal occupies at least two time units on a time domain resource, and a time unit occupied by a primary synchronization signal in the first signal and a time unit occupied by a secondary synchronization signal in the first signal are consecutive time units in the at least two time units.

According to a fourth aspect, a signal transmission method is provided. The method includes: receiving, by a first device, a first signal, where the first signal occupies at least two time units on a time domain resource, and a time unit occupied by a primary synchronization signal in the first signal and a time unit occupied by a secondary synchronization signal in the first signal are consecutive time units in the at least two time units.

The time domain resource occupied by the first signal is reduced because the time units occupied by the primary synchronization signal and the secondary synchronization signal are consecutive, thereby reducing signaling overheads.

According to a fifth aspect, a signal transmission method is provided. The method includes: sending, by a second device, a first signal, where the first signal occupies at least two time units on a time domain resource, and a time unit occupied by a primary synchronization signal in the first signal and a time unit occupied by a secondary synchronization signal in the first signal are consecutive time units in the at least two time units.

According to a sixth aspect, a signal transmission apparatus is provided. The signal transmission apparatus may be a first device, or may be a chip in the first device. The apparatus has a function of implementing the implementations of the first aspect. The function may be implemented by using hardware, or may be implemented by using hardware executing corresponding software. The hardware or the software includes one or more units corresponding to the foregoing function.

In a possible design, when the apparatus is the first device, the first device includes a processing module and a transceiver module. The processing module may be, for example, a processor, and the transceiver module may be, for example, a transceiver, and the transceiver includes a radio frequency circuit. Optionally, the first device further includes a storage unit, and the storage unit may be, for example, a memory. When the first device includes the storage unit, the storage unit is configured to store a computer-executable instruction, the processing module is connected to the storage unit, and the processing module executes the computer-executable instruction stored in the storage unit, so that the first device performs the foregoing signal transmission method in any one of the implementations of the first aspect.

In another possible design, when the apparatus is the chip in the first device, the chip includes a processing module and a transceiver module. The processing module may be, for example, a processor, and the transceiver module may be, for example, an input/output interface, a pin, or a circuit on the chip. The processing module may execute a computer-executable instruction stored in a storage unit, so that the chip in the first device performs the foregoing signal transmission method in any one of the implementations of the first aspect. Optionally, the storage unit is a storage unit in the chip, for example, a register or a buffer, or the storage unit may be a storage unit in the first device but outside the chip, for example, a read-only memory (ROM), another type of static storage device that can store static information and an instruction, or a random access memory (RAM).

The processor mentioned in any of the foregoing designs may be a general-purpose central processing unit (CPU), a microprocessor, an application-specific integrated circuit (ASIC), or one or more integrated circuits for controlling program execution of the signal transmission method according to the first aspect.

According to a seventh aspect, a signal transmission apparatus is provided in this application. The apparatus may be a second device, or may be a chip in the second device. The signal transmission apparatus has a function of implementing the implementations of the second aspect. The function may be implemented by using hardware, or may be implemented by using hardware executing corresponding software. The hardware or the software includes one or more units corresponding to the foregoing function.

In a possible design, when the signal transmission apparatus is the second device, the second device includes a processing module and a transceiver module. The processing module may be, for example, a processor, and the transceiver module may be, for example, a transceiver, and the transceiver includes a radio frequency circuit. Optionally, the first device further includes a storage unit, and the storage unit may be, for example, a memory. When the first device includes the storage unit, the storage unit is configured to store a computer-executable instruction, the processing module is connected to the storage unit, and the processing module executes the computer-executable instruction stored in the storage unit, so that the first device performs the foregoing signal transmission method in any one of the implementations of the second aspect.

In another possible design, when the apparatus is the chip in the second device, the chip includes a processing module and a transceiver module. The processing module may be, for example, a processor, and the transceiver module may be, for example, an input/output interface, a pin, or a circuit on the chip. The processing module may execute a computer-executable instruction stored in a storage unit, so that the chip in the first device performs the foregoing signal transmission method in any one of the implementations of the second aspect. Optionally, the storage unit is a storage unit in the chip, for example, a register or a buffer, or the storage unit may be a storage unit in the first device but outside the chip, for example, a ROM, another type of static storage device that can store static information and an instruction, or a RAM.

The processor mentioned in any of the foregoing designs may be a CPU, a microprocessor, an ASIC, or one or more integrated circuits for controlling program execution of the signal transmission method according to the second aspect.

According to an eighth aspect, a signal transmission apparatus is provided in this application. The apparatus may be a third device, or may be a chip in the third device. The signal transmission apparatus has a function of implementing the implementations of the third aspect. The function may be implemented by using hardware, or may be implemented by using hardware executing corresponding software. The hardware or the software includes one or more units corresponding to the foregoing function.

In a possible design, when the signal transmission apparatus is the third device, the third device includes a processing module and a transceiver module. The processing module may be, for example, a processor, and the transceiver module may be, for example, a transceiver, and the transceiver includes a radio frequency circuit. Optionally, the third device further includes a storage unit, and the storage unit may be, for example, a memory. When the third device includes the storage unit, the storage unit is configured to store a computer-executable instruction, the processing module is connected to the storage unit, and the processing module executes the computer-executable instruction stored in the storage unit, so that the third device performs the foregoing signal transmission method in any one of the implementations of the third aspect.

In another possible design, when the apparatus is the chip in the third device, the chip includes a processing module and a transceiver module. The processing module may be, for example, a processor, and the transceiver module may be, for example, an input/output interface, a pin, or a circuit on the chip. The processing module may execute a computer-executable instruction stored in a storage unit, so that the chip in the third device performs the foregoing signal transmission method in any one of the implementations of the third aspect. Optionally, the storage unit is a storage unit in the chip, for example, a register or a buffer, or the storage unit may be a storage unit in the third device but outside the chip, for example, a ROM, another type of static storage device that can store static information and an instruction, or a RAM.

The processor mentioned in any of the foregoing designs may be a CPU, a microprocessor, an ASIC, or one or more integrated circuits for controlling program execution of the signal transmission method according to the third aspect.

According to a ninth aspect, a computer storage medium is provided. The computer storage medium stores program code. The program code is used to indicate an instruction of executing the method according to any one of the first aspect, the second aspect, the third aspect, the fourth aspect, and the fifth aspect, or any one of the possible implementations of the first aspect, the second aspect, the third aspect, the fourth aspect, and the fifth aspect.

According to a tenth aspect, a computer program product including an instruction is provided. When the computer program product runs on a computer, the computer is enabled to perform the method according to any one of the first aspect, the second aspect, the third aspect, the fourth aspect, and the fifth aspect, or any one of the possible implementations of the first aspect, the second aspect, the third aspect, the fourth aspect, and the fifth aspect.

According to the foregoing solutions, the first device receives the configuration information that is sent by the third device and that is used to indicate the quantity of times for which the third device sends to the signal group, in other words, learns in advance, based on the configuration information, the quantity of receive beams that can be measured, and selects, after receiving first signals of the quantity, the optimal receive beam from the receive beams that have been detected, to avoid continuously detecting more first signals for the selection, thereby reducing the power consumption of the first device.

DESCRIPTION OF EMBODIMENTS

The following describes technical solutions of this application with reference to the accompanying drawings.

In this application, term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects. The phrase "at least one of x or y" or any variation means "x", "y" or both "x" and "y"

The technical solutions in embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, and a new radio (NR) system.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may further be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) or the code division multiple access (CDMA) system, may be a NodeB (NB) in the wideband code division multiple access (WCDMA) system, may be an evolved NodeB (eNB or eNodeB) in the LTE system, or may be a radio controller in a cloud radio access network (CRAN) scenario. Alternatively, the network device may be a relay node, an access point, a vehicle-mounted device, a wearable device, a network device in the 5G network, a network device in the future evolved PLMN network, or the like. This is not limited in the embodiments of this application.

Figure 1:
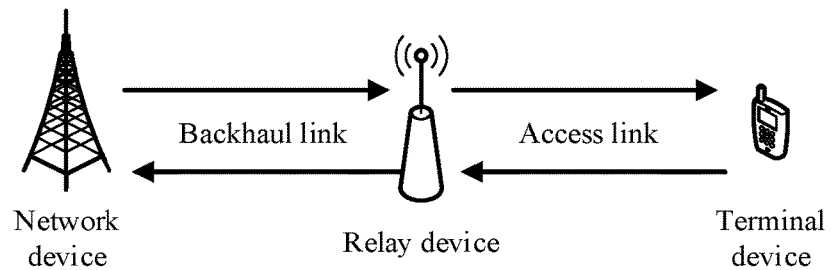
FIG. 1 is a schematic diagram of an application scenario according to an embodiment of this application.

FIG. 1 is a schematic diagram of an application scenario according to an embodiment of this application. A communications system shown in FIG. 1 includes three types of devices: a network device, a relay device, and a terminal device. A link between the network device and the relay device may be referred to as a "backhaul (BH) link", and a link between the relay device and the terminal device may be referred to as an "access (AC) link".

It should be noted that in this embodiment of this application, a "link" may refer to single-hop transmission between devices, and a "connection" may refer to single-hop or multi-hop transmission between devices.

Figure 2:
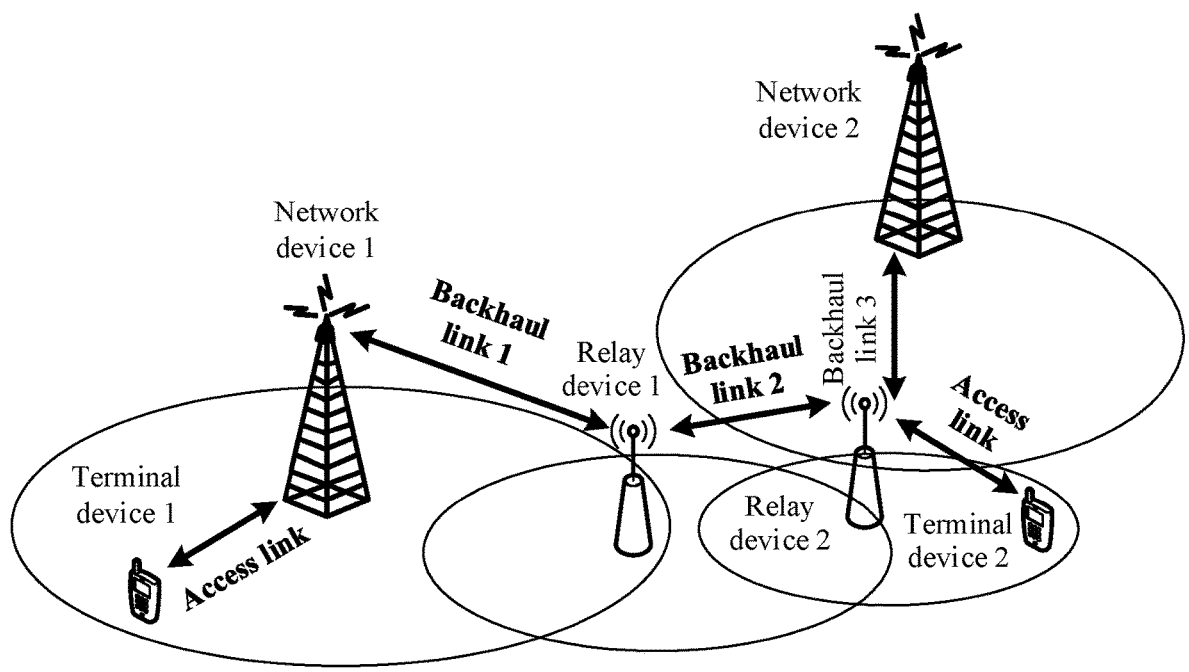
FIG. 2 is a schematic diagram of another application scenario according to an embodiment of this application.

FIG. 2 is a schematic diagram of another application scenario according to an embodiment of this application. A communications system shown in FIG. 2 includes a network device, and a plurality of relay and terminal devices. To be specific, the network device may communicate with the terminal device via the plurality of relay devices (for example, a relay device 1 and a relay device 2 in FIG. 2). A link between two relay devices may also be referred to as a "backhaul link".

It should be noted that if a connection has been established between the relay device 1 and a network device 1, and the relay device 2 accesses the relay device 1, the relay device 2 becomes a subordinate device of the relay device 1. In this way, a connection between the relay device 2 and the network device 1 may be referred to as a "multi-hop relay structure". In addition, if a connection is also established between the relay device 2 and a network device 2, the relay device 2 may be located in a connection from the network device 1 to the relay device 1 and then to the relay device 2, or may be located in a connection from the network device 2 to the relay device 2. Such a connection structure may be referred to as a "multi-connection relay structure".

It should be understood that the quantity of relay devices is not limited in the communications system in this embodiment of this application. For example, the terminal device may communicate with the network device through a connection including three, four, or five relay devices.

It should be further understood that this application imposes no limitation on names of the links between a network device and a relay device, a link between the two relay devices, and a link between a relay device and a terminal device. In addition, the network device may also be referred to as a "provider network device" or a "host network device".

Optionally, the relay device may be a relay node (RN), a relay transmission reception point (rTRP), or an integrated access and backhaul node (IAB node).

Figure 3:
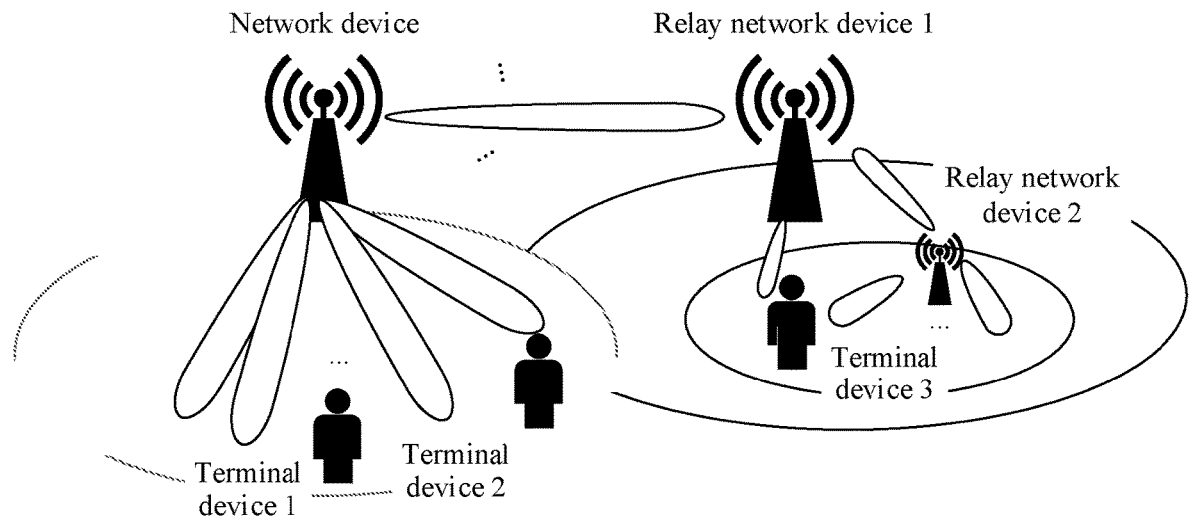
FIG. 3 is a schematic diagram of still another application scenario according to an embodiment of this application.

FIG. 3 is a schematic diagram of still another application scenario according to an embodiment of this application. As shown in FIG. 3, a physical form of a relay device may be different from that of a terminal device. For example, the relay device may be a relay network device such as a base station. As shown in FIG. 3, an antenna height of the relay network device and a distance from the relay network device to a serving network device may be significantly different from an antenna height of the terminal device and a distance from the terminal device to the serving network device.

To establish the foregoing "multi-hop relay structure" and "multi-connection relay structure" (for ease of description, in the following embodiments, the two structures may be referred to as "multi-hop and multi-connection relay structures"), the relay device may discover or measure a nearby relay device or network device, so that the relay device can be synchronized with another relay device or network device, and measure signal quality.

In a conventional solution, to discover or measure a neighboring cell of the terminal device, the serving network device needs to send configuration information to the terminal device, to instruct the terminal device to discover or measure another network device that can provide a service for the terminal device. In this way, the terminal device can receive a downlink signal based on the configuration information. However, because the terminal device may include a plurality of receive beams, the terminal device can discover or measure only a network device that can periodically send signals over a long period. In other words, the terminal device can discover or measure another network device only by continuously detecting signals periodically sent by the network device. Consequently, power consumption of the terminal device is relatively high.

It should be understood that the configuration information sent by the serving network device to the terminal device may include information such as a frequency that the terminal device may use to measure and a cell identity (ID) list of the network device that needs to be measured.

Figure 4:
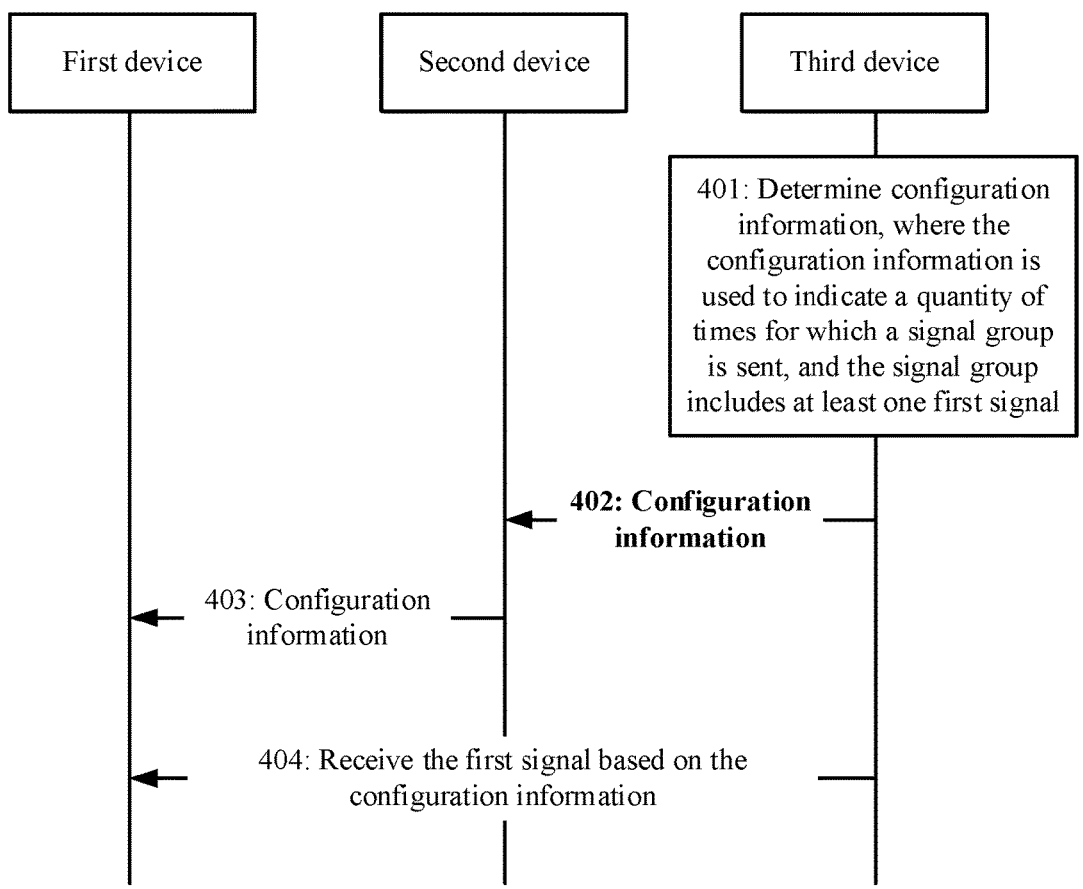
FIG. 4 is a schematic flowchart of a signal transmission method according to an embodiment of this application.

FIG. 4 is a schematic flowchart of a signal transmission method according to an embodiment of this application.

401: A third device may determine configuration information, where the configuration information is used to indicate a quantity of times for which the third device sends a signal group, and the signal group includes at least one first signal.

Specifically, a transmit beam corresponding to any one of the at least one first signal included in the signal group is different from a transmit beam corresponding to another first signal. In other words, any one of the at least one first signal included in the signal group does not have a quasi co-location (QCL) relationship with other first signals. A first device may support a plurality of receive beams. To be specific, the first device scans the plurality of receive beams to accurately determine a receive beam aligned with a transmit beam that can be scanned by the third device. In other words, the third device needs to send the same first signal by using the same transmit beam for a number of times equal to a quantity of receive beams that can be scanned by the first device.

It should be understood that in this embodiment of this application, signals corresponding to the same transmit beam may indicate that the signals have a QCL relationship, and signals corresponding to different transmit beams may indicate that the signals do not have a QCL relationship.

It should be noted that in the following embodiments, a receive beam that can be scanned by the first device and that is aligned with a transmit beam that can be scanned by the third device may be the receive beam having the highest signal quality of all of the plurality of receive beams used by the first device to receive the first signals after the third device sends first signals by using the transmit beam.

It should be understood that the third device in this embodiment of this application may be the network device described above.

Optionally, the quantity of times for which the third device sends the signal group is equal to a quantity of all receive beams that can be scanned by the first device.

Specifically, the first device can detect receive beams of the same quantity as the of times for which the third device sends the signal group, and selects, in receive beams that have been detected, the receive beam aligned with the transmit beam, to avoid a case in which the first device continuously detects more first signals for selection, thereby reducing power consumption of the first device.

Optionally, at least one of the times for which the third device sends the signal group is a time at which a first signal group is sent, or a time at which a last signal group is sent.

Specifically, the configuration information may directly indicate the quantity of times for which the third device sends the signal group, or may indirectly indicate the quantity of times for which the third device sends the signal group. For example, based on the time at which the first signal group is sent, an agreed time at which the last signal group is sent, and a time interval between times at which adjacent signal groups are sent, the first device may determine the quantity of times for which the third device sends the signal group. Alternatively, based on the time at which the last signal group is sent, an agreed time at which the first signal group is sent, and a time interval between times at which adjacent signal groups are sent, the first device may determine the quantity of times for which the third device sends the signal group.

It should be noted that the time at which the first signal group is sent may be a start time at which the first signal group is sent, namely, a time at which the first signal in the first signal group is sent, or may be an end time at which the first signal group is sent, namely, a time at which the last first signal in the first signal group is sent. Correspondingly, the time at which the last signal group is sent may also be a time at which the first signal in the last signal group is sent, or may be a time at which the last first signal in the last signal group is sent. This is not limited in this application.

Optionally, in this embodiment of this application, each first signal in the signal group is identified by using a number. A first signal corresponding to each number is sent by using one beam, and first signals corresponding to different numbers are sent by using different beams.

It should be understood that the number may be preconfigured, agreed in a protocol, or set by the third device. This is not limited in this application.

Optionally, in this embodiment of this application, the first device may be the network device, the relay device, or the relay network device described above, or may be the terminal device described above. This is not limited in this application.

Optionally, the first signal may be a type of signal used by the first device to discover or measure the third device.

Optionally, the first signal may include a primary synchronization signal and a secondary synchronization signal.

Optionally, the configuration information is further used to indicate a type of first signal. The type of first signal is a first type or a second type: a signal of the first type includes a primary synchronization signal, a secondary synchronization signal, and a broadcast signal; and a signal of the second type includes a primary synchronization signal and a secondary synchronization signal.

Specifically, the first device may determine, based on the configuration information, content specifically included in the first signal.

Optionally, when the type of first signal is the second type, the first signal occupies at least two time units on a time domain resource, and a time unit occupied by a primary synchronization signal in the first signal and a time unit occupied by a secondary synchronization signal in the first signal are consecutive time units in the at least two time units.

Specifically, the first signal occupies at least two time units on the time domain resource, and the time unit occupied by the primary synchronization signal and the time unit occupied by the secondary synchronization signal are consecutive. The primary synchronization signal is used for synchronization between devices, and the secondary synchronization signal and the primary synchronization signal are jointly used to indicate a cell identity. If the first signal is used only for synchronization between devices and cell identification, signaling overhead can be reduced because the time units occupied by the primary synchronization signal and the secondary synchronization signal are consecutive.

Optionally, when the first signal includes the primary synchronization signal and the secondary synchronization signal, the primary synchronization signal and the secondary synchronization signal may occupy the same time unit.

Optionally, the time unit may be a frame, a subframe, a slot, a mini-slot, an OFDM symbol, or the like.

Optionally, the first signal may include a primary synchronization signal, a secondary synchronization signal, and a physical broadcast channel (PBCH) signal.

Optionally, the first signal may further include a channel state information reference signal (CSI-RS), and the CSI-RS may be used to measure channel quality.

Optionally, the third device may determine configuration information received by a type of first device based on a historical record.

Optionally, the configuration information may be further used to indicate at least one of: a quantity of first signals included in the signal group, a time domain resource position occupied by the first signal, a frequency domain resource position occupied by the first signal, or a periodicity in which the signal group is sent.

Specifically, the configuration information may indicate the quantity of first signals included in the signal group. In other words, the configuration information indicates the quantity of transmit beams that can be scanned by the third device. In this embodiment of this application, the time domain resource position may be a position of a subframe, a slot, or an orthogonal frequency division multiplexing (OFDM) symbol. In this embodiment of this application, the frequency domain resource position may be a position of a physical resource block (PRB). The periodicity in which the signal group is sent may be a time interval between times at which signal groups are sent. The periodicity or the time interval may be in a unit of a frame, a subframe, a slot, a mini-slot, an OFDM symbol, or the like.

Figure 5:
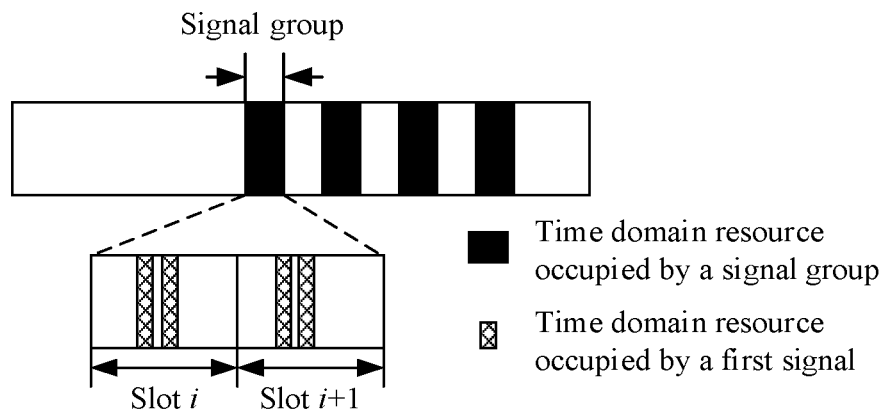
FIG. 5 is a schematic diagram of a signal transmission method according to another embodiment of this application.

For example, the signal group includes four first signals distributed in two consecutive slots. As shown in FIG. 5, the signal group may be sent for four times at same time intervals. In other words, the third device sends the signal group for four times, and the periodicity in which the signal group is sent is one of the same time intervals.

It should be understood that one signal group includes at least one signal, the at least one signal may occupy one or more time units, and a time unit may be a frame, a subframe, a slot, an OFDM symbol, or the like. In FIG. 5, an example in which the at least one signal occupies two slots (for example, a slot i and a slot i+1) is used for description.

For another example, when the first signal includes the primary synchronization signal, the secondary synchronization signal, and the PBCH signal, the first signal may be an SSB signal in the NR protocol.

Optionally, the third device may receive a configuration request sent by a second device, and the configuration request may be used to trigger the configuration information.

Specifically, the second device may be configured to serve the first device. In other words, the first device currently accesses the second device. The configuration request sent by the second device may be used to trigger the third device to send the configuration information to the second device. In other words, when the configuration information needs to be determined, the second device triggers the third device to determine the configuration information for the first device, thereby reducing resource overheads.

It should be noted that the third device may be a device in a neighboring cell of the second device, or another device that can be detected by the second device and that is used to serve the first device.

Optionally, the second device may be the network device described above.

Optionally, the second device may send parameter information to the third device. The parameter information is used to indicate at least one of the time domain resource position occupied by the first signal, the frequency domain resource position occupied by the first signal, the quantity of times for which the third device sends the signal group, or a beam corresponding to the first signal.

Specifically, the second device may carry the parameter information in the configuration request sent to the third device, and indicate the configuration information by using the parameter information, and the second device recommends that the third device configures the configuration information for the first device. The parameter information may be used to indicate a time domain resource position occupied by a first signal in the signal group, a frequency domain resource position occupied by the first signal, or a beam corresponding to the first signal, or may be used to indicate a time domain resource position occupied by each first signal in the signal group, a frequency domain resource position occupied by the first signal, or a beam corresponding to the first signal.

The time domain resource position may include a time domain starting position, a time domain length, and/or a periodicity. The frequency domain resource position may include a frequency domain starting position, a frequency domain width, and/or a subcarrier spacing.

Optionally, the parameter information may be independently sent, or may be carried in the configuration request. This is not limited in this application.

Optionally, the parameter information may further indirectly indicate the beam corresponding to the first signal. To be specific, the parameter information includes coordinate information and height information of the first device, and indicates the corresponding beam by using the coordinate information and the height information of the first device.

Optionally, the second device may determine the parameter information based on the configuration information received by the second device and the configuration information received by the first device.

Specifically, the parameter information may be determined by the second device, or may be reported by the first device. Alternatively, the parameter information may be partially determined by the second device, and partially reported by the first device.

Optionally, the third device determines the configuration information based on the parameter information carried in the configuration request. A parameter indicated by the configuration information may be the same as or different from that indicated by the parameter information.

For example, a time-frequency domain resource that is occupied by the first signal and that is indicated by the configuration information determined by the third device may be the same as a time-frequency domain resource indicated by the parameter information. The quantity of first signals included in the signal group and that is indicated by the configuration information determined by the third device is equal to a quantity that is of beams corresponding to the first signals and is indicated by the parameter information. The quantity that of times for which the third device sends the signal group and that is indicated by the configuration information determined by the third device is equal to a quantity that is of times for which the third device sends the signal group and that is indicated by the parameter information.

Optionally, if the first device is a network device, the time-frequency domain resource indicated by the configuration information configured by the third device for the first device may be different from a time-frequency resource configured for a terminal device served by the third device.

Specifically, the third device may serve as a network device, and may provide service for a terminal device within a coverage area of the third device. To be specific, the third device may configure a time-frequency resource position for the terminal device served by the third device. The time-frequency resource position may be different from a time-frequency resource position indicated by the configuration information. In other words, the third device may separately and independently configure time-frequency resources for the first device and the terminal device served by the third device. In this way, when the third device sends a second signal on the time-frequency resource configured for the terminal device, and the third device sends the first signal on the time-frequency resource configured for the first device, no interference is generated, thereby further improving signal transmission quality.

It should be noted that when time-frequency resource positions are different, it may be indicated that time domain resource positions may be different, frequency domain resource positions may be different, or the time domain resource positions and the frequency domain resource positions may be different.

It should be understood that in this embodiment of this application, the time-frequency resource positions are different, indicating that the time-frequency resources do not overlap.

Figure 6:
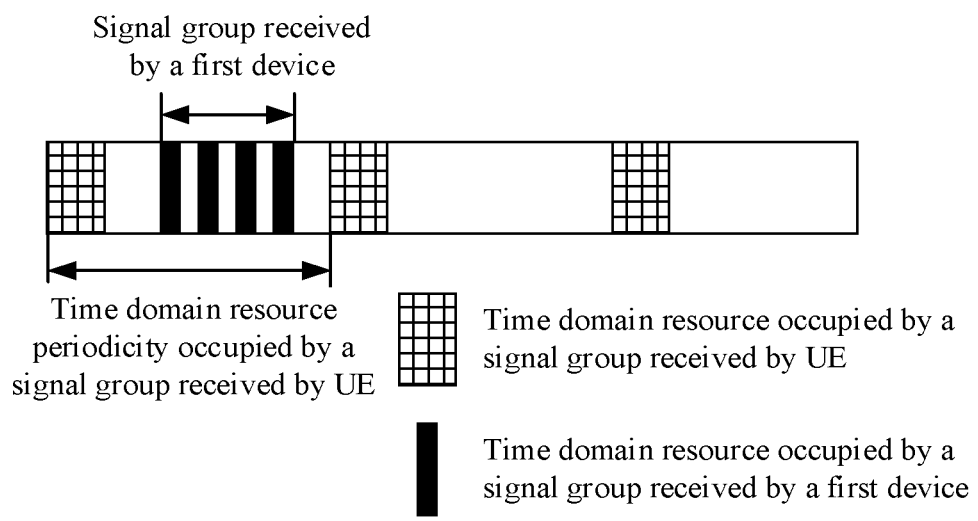
FIG. 6 is a schematic diagram of a signal transmission method according to still another embodiment of this application.

For example, as shown in FIG. 6, a time domain resource configured by the third device for UE is independent of a time domain resource configured by the third device for the first device.

Optionally, in this embodiment of this application, the second signal may include a primary synchronization signal, a secondary synchronization signal, and a PBCH signal.

It should be further understood that the second signal and the first signal may be same types of signals, or may be different types of signals.

Optionally, the time-frequency resource configured by the third device for the first device may be an idle time-frequency resource in time-frequency resources configured by the third device for the terminal device served by the third device.

Specifically, the third device may first configure a time-frequency resource for the terminal device served by the third device, select a time-frequency resource from remaining idle time-frequency resources, and then configure the time-frequency resource for the first device. Alternatively, the third device first configures a time-frequency resource for the first device, selects a time-frequency resource from remaining idle time-frequency resources, and configures the time-frequency resource for the terminal device. In other words, the terminal device and the first device may reuse a time-frequency resource, thereby improving resource utilization.

Figure 7:
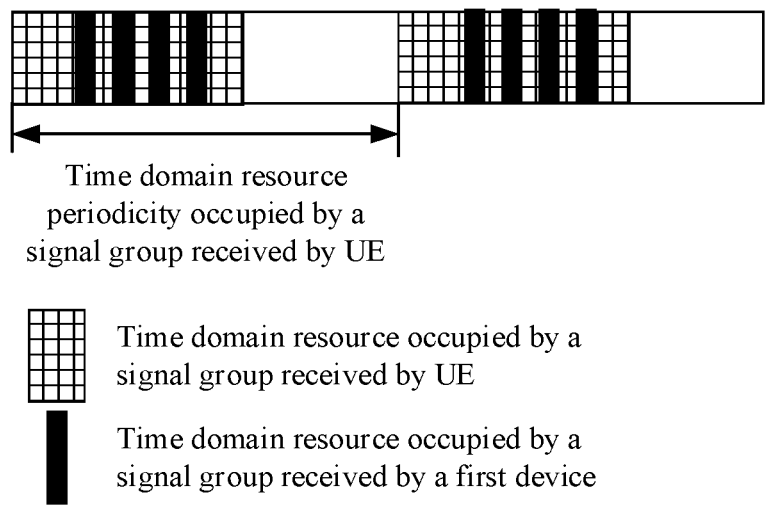
FIG. 7 is a schematic diagram of a signal transmission method according to yet another embodiment of this application.

For example, as shown in FIG. 7, a time domain resource configured by the third device for the UE and a time domain resource configured by the third device for the first device can be reused. Specifically, usage of a time-frequency resource is configured by the third device.

402: The third device sends the configuration information to the second device. Correspondingly, the second device receives the configuration information sent by the third device.

Specifically, after determining the configuration information for the first device, the third device needs to send the configuration information to the second device and then to the first device.

Optionally, the third device may periodically or continuously send the configuration information to the second device.

Optionally, the third device may send the configuration information after the configuration information is triggered based on the configuration request.

403: The second device sends the configuration information to the first device. Correspondingly, the first device receives the configuration information sent by the second device.

404: The third device sends the first signal. Correspondingly, the first device receives, based on the configuration information, the first signal sent by the third device.

Specifically, the third device may send each first signal in the signal group, or may send some of the first signals in the signal group. The quantity of times for which the third device sends the signal group is equal to the times for which the third device sends each first signal in the signal group. The first device can scan each receive beam based on the configuration information configured by the third device, to determine a receive beam that is aligned with a transmit beam that can be scanned by the third device. In other words, the first device receives the configuration information configured by the third device for the first device, can detect receive beams of a quantity that is equal to the quantity of times for which the third device sends the signal group, and selects, in detected receive beams, a receive beam aligned with the transmit beam. In other words, the first device learns in advance, based on the configuration information, a quantity of receive beams that can be measured, and the first device selects, after receiving first signals of the quantity, an optimal receive beam from the detected receive beams, to avoid continuously detecting more first signals for selection, thereby reducing power consumption of the first device.

In addition, the first signal is used by the first device to discover or measure the third device. That is, the configuration information is used for the first device. When the first device is the network device, because the antenna height and a position coordinate of the terminal device are different from the antenna height and a position coordinate of the network device, in this embodiment of this application, when the first device is the network device, efficiency of discovering or measuring another serving base station is improved.

For example, as shown in FIG. 3, a terminal device 3 currently accesses a relay network device 2, and the relay network device 2 needs the terminal device 3 to discover or measure a relay network device 1. In this case, the relay network device 2 sends a configuration request to the relay network device 1, and the relay network device 1 configures corresponding configuration information for the terminal device 3 based on the configuration request, and sends the configuration information to the relay network device 2 and then to the terminal device 3. In this way, the terminal device 3 receives, based on the configuration information, a synchronization signal sent by the relay network device 1, thereby discovering or measuring the relay network device 1, and accessing the relay network device 1.

More specifically, the configuration information may indicate that a quantity of times for which the relay network device 1 sends a signal group is m, and the configuration information indicates a time-frequency resource 1 occupied by a synchronization signal 1 in the signal group is located. In other words, the terminal device 3 learns in advance that a quantity of receive beams that can be measured is m. If a quantity of all receive beams that can be scanned by the terminal device 3 is n, and n>m, the terminal device 3 separately receives m synchronization signals 1 on the time-frequency resource 1 by using m receive beams selected from the n receive beams, and selects an optimal receive beam from the m receive beams. The configuration information may further indicate that a quantity of synchronization signals included in the signal group is h. To be specific, the relay network device 1 receives each signal in the signal group in a manner in which the synchronization signal 1 in the signal group is received. The terminal device 3 avoids using another receive beam other than the m receive beams to continuously detecting synchronization signals 1, thereby reducing the power consumption of the first device.

In addition, the configuration information may further indicate a periodicity T in which the signal group is sent once. In this way, after finishing receiving signals in a signal group, the terminal device 3 may receive signals in a next signal group after the periodicity T, to avoid continuously detecting the signal group, thereby reducing the power consumption of the first device.

It should be understood that the first signals in the signal group may be different, or some signals may be the same.

Optionally, after receiving the first signal on the corresponding receive beam, the first device reports a measurement result to the second device. The second device may send the measurement result to the third device. In this way, the third device may configure a subsequent random access resource based on the measurement result.

Specifically, the measurement result may include beam information, link quality information, and the like.

Therefore, in the signal transmission method according to this embodiment of this application, the first device receives the configuration information that is sent by the third device and that is used to indicate the quantity of times for which the third device sends the signal group. The first device, in other words, learns in advance, based on the configuration information, the quantity of receive beams that can be measured, and selects, after receiving first signals of the quantity, the optimal receive beam from the receive beams that have been detected, to avoid continuously detecting more first signals for selection, thereby reducing the power consumption of the first device.

It should be understood that in the embodiments of this application, specific examples are merely intended to help a person skilled in the art better understand the embodiments of this application, rather than limit the scope of the embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the signal transmission method according to the embodiments of this application, and the following describes signal transmission apparatuses in the embodiments of this application.

Figure 8:
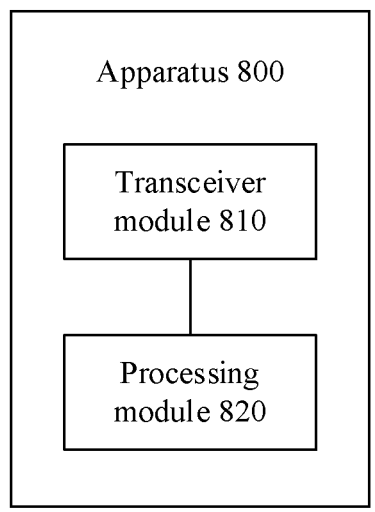
FIG. 8 is a schematic block diagram of a signal transmission apparatus according to an embodiment of this application.

FIG. 8 shows a signal transmission apparatus 800 according to an embodiment of this application. The signal transmission apparatus 800 may be the foregoing first device.

It should be understood that the signal transmission apparatus 800 may correspond to the first device in the foregoing method embodiments, and may have any function of the first device in the methods.

The apparatus 800 includes:

a transceiver module 810, configured to receive configuration information sent by a second device, where the configuration information is used to indicate a quantity of times for which a third device sends a signal group, and the signal group includes at least one first signal; and a processing module 820, configured to receive, based on the configuration information, the first signal sent by the third device.

Optionally, the transceiver module 810 is specifically configured to receive the configuration information sent by the second device, where the configuration information is triggered by the third device based on a configuration request sent by the second device.

Optionally, the transceiver module 810 is further configured to send parameter information to the second device.

The transceiver module 810 is specifically configured to:

receive the configuration information, where the configuration information is determined based on the parameter information.

Optionally, the parameter information is used to indicate at least one of a time-frequency domain resource position occupied by the first signal, the quantity of times for which the third device sends the signal group, or a quantity of transmit beams corresponding to first signals.

Optionally, the configuration information is used to indicate at least one of a quantity of first signals included in the signal group, the time-frequency domain resource position occupied by the first signal, or a periodicity in which the signal group is sent once.

Optionally, the time-frequency domain resource position that is occupied by the first signal and that is indicated by the configuration information is different from a time-frequency domain resource position occupied by a second signal, and the second signal is a signal sent by the second device to a terminal device served by the second device.

Optionally, the configuration information is further used to indicate a type of first signal, the type of first signal is a first type or a second type, a first signal of the first type includes a primary synchronization signal, a secondary synchronization signal, and a broadcast signal, and a first signal of the second type includes a primary synchronization signal and a secondary synchronization signal.

Optionally, when the type of first signal is the second type, the first signal occupies at least two time units on a time domain resource, and a time unit occupied by a primary synchronization signal in the first signal and a time unit occupied by a secondary synchronization signal in the first signal are consecutive time units in the at least two time units.

Optionally, the signal transmission apparatus 800 provided in this embodiment of this application may be the first device, or may be a chip in the first device.

It should be understood that the signal transmission apparatus 800 according to this embodiment of this application may correspond to the first device in the signal transmission methods in the embodiments of FIG. 4 to FIG. 7. In addition, the foregoing and other management operations and/or functions of the modules in the signal transmission apparatus 800 are separately used to implement corresponding steps in the foregoing methods. For brevity, details are not described herein again.

Figure 9:
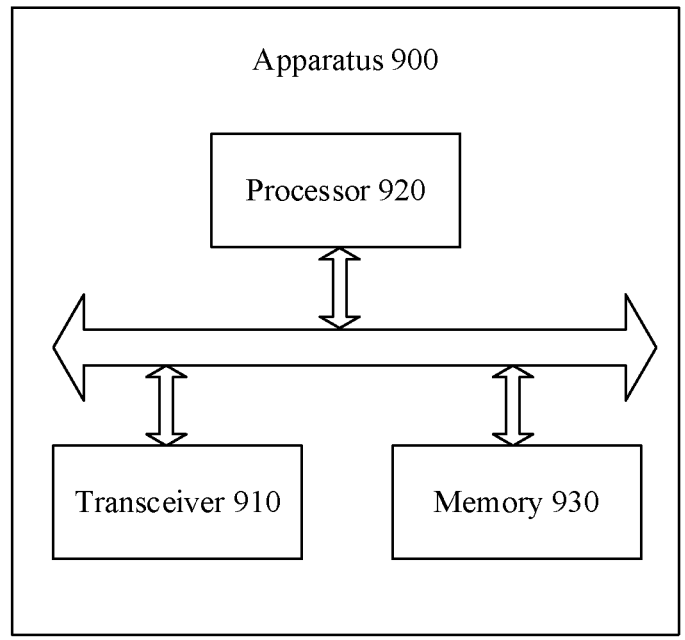
FIG. 9 is a schematic structural diagram of a signal transmission apparatus according to an embodiment of this application.

Optionally, if the signal transmission apparatus 800 is the first device, in this embodiment of this application, the transceiver module 810 may be implemented by using a transceiver 910, and the processing module 820 may be implemented by using a processor 920. As shown in FIG. 9, a signal transmission apparatus 900 may include the transceiver 910, the processor 920, and a memory 930. The memory 930 may be configured to store indication information, and may be further configured to store code, an instruction, and the like that are executed by the processor 920. The transceiver 910 may include a radio frequency circuit. Optionally, the first device further includes a storage unit.

The storage unit may be, for example, a memory. When the first device includes the storage unit, the storage unit is configured to store a computer-executable instruction, the processor is connected to the storage unit, and the processor executes the computer-executable instruction stored in the storage unit, so that the first device performs the foregoing signal transmission methods.

Optionally, if the signal transmission apparatus 800 is the chip in the first device, the chip includes the processing module 820 and the transceiver module 810. The transceiver module 810 may be implemented by using a transceiver 910, the processing module 820 may be implemented by using a processor 920, and the transceiver module may be, for example, an input/output interface, a pin, or a circuit. The processing module may execute a computer-executable instruction stored in a storage unit. The storage unit is a storage unit in the chip, for example, a register or a buffer, or the storage unit may be a storage unit in a terminal but outside the chip, for example, a read-only memory (ROM), another type of static storage device that can store static information and an instruction, or a random access memory (RAM).

Figure 10:
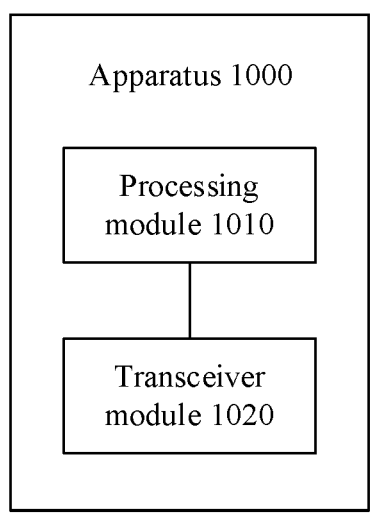
FIG. 10 is a schematic block diagram of a signal transmission apparatus according to another embodiment of this application.

FIG. 10 shows a signal transmission apparatus 1000 according to an embodiment of this application. The signal transmission apparatus 1000 may be the foregoing second device.

It should be understood that the signal transmission apparatus 1000 may correspond to the second device in the method embodiments, and may have any function of the second device in the methods.

The apparatus 1000 includes:

a processing module 1010, configured to obtain configuration information, where the configuration information is used to indicate the quantity of times for which a signal group is sent, wherein the signal group includes at least one first signal, and wherein the first signal is used by a first device to discover or measure a third device; and a transceiver module 1020, configured to send the configuration information to the first device.

Optionally, the transceiver module 1020 is further configured to:

send a configuration request to the third device; and receive the configuration information sent by the third device, where the configuration information is triggered by using the configuration request.

Optionally, the transceiver module 1020 is further configured to:

receive parameter information sent by the first device;

send the parameter information to the third device; and receive the configuration information sent by the third device, where the configuration information is determined based on the parameter information.

Optionally, the parameter information is used to indicate at least one of: a time-frequency domain resource position occupied by the first signal, the quantity of times for which the third device sends the signal group, and/or a quantity of transmit beams corresponding to first signals.

Optionally, the configuration information is used to indicate at least one of: a quantity of first signals included in the signal group, the time-frequency domain resource position occupied by the first signal, and/or a periodicity in which the signal group is sent once.

Optionally, the time-frequency domain resource position that is occupied by the first signal and that is indicated by the configuration information is different from a time-frequency domain resource position occupied by a second signal, and the second signal is a signal sent by the third device to a terminal device served by the third device.

Optionally, the configuration information is further used to indicate a type of first signal, the type of first signal is a first type or a second type, a first signal of the first type includes a primary synchronization signal, a secondary synchronization signal, and a broadcast signal, and a first signal of the second type includes a primary synchronization signal and a secondary synchronization signal.

Optionally, when the type of first signal is the second type, the first signal occupies at least two time units on a time domain resource, and a time unit occupied by a primary synchronization signal in the first signal and a time unit occupied by a secondary synchronization signal in the first signal are consecutive time units in the at least two time units.

Optionally, the signal transmission apparatus 1000 provided in this embodiment of this application may be the second device, or may be a chip in the second device.

It should be understood that the signal transmission apparatus 1000 according to this embodiment of this application may correspond to the second device in the signal transmission methods in the embodiments of FIG. 4 to FIG. 7. In addition, the foregoing and other management operations and/or functions of the modules in the signal transmission apparatus 1000 are separately used to implement corresponding steps in the foregoing methods. For brevity, details are not described herein again.

Figure 11:
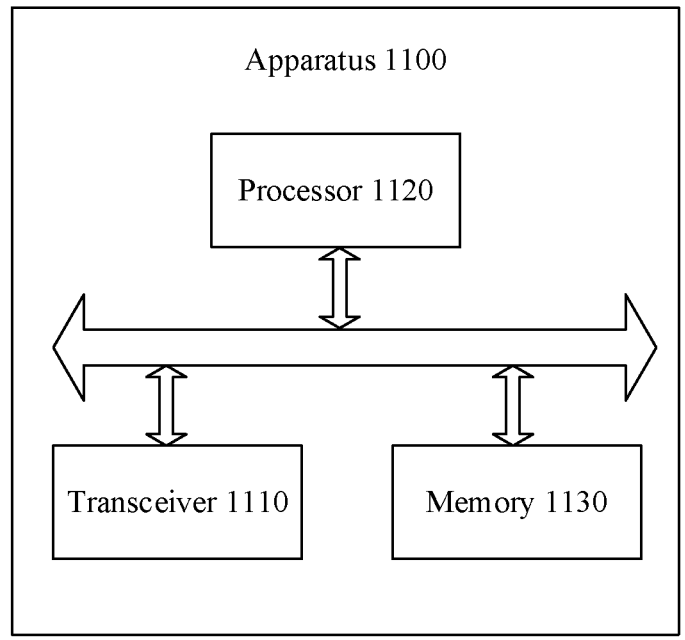
FIG. 11 is a schematic structural diagram of a signal transmission apparatus according to another embodiment of this application.

Optionally, if the signal transmission apparatus 1000 is the second device, in this embodiment of this application, the transceiver module 1020 may be implemented by using a transceiver 1111, and the processing module 1010 may be implemented by using a processor 1120. As shown in FIG. 11, a signal transmission apparatus 1100 may include the transceiver 1110, the processor 1120, and a memory 1130. The memory 1130 may be configured to store indication information, and may be further configured to store code, an instruction, and the like that are executed by the processor 1120. The transceiver 1110 may include a radio frequency circuit. Optionally, the second device further includes a storage unit.

The storage unit may be, for example, a memory. When the second device includes the storage unit, the storage unit is configured to store a computer-executable instruction, the processor is connected to the storage unit, and the processor executes the computer-executable instruction stored in the storage unit, so that the second device performs the foregoing signal transmission methods.

Optionally, if the signal transmission apparatus 1000 is the chip in the second device, the chip includes the processing module 1010 and the transceiver module 1020. The transceiver module 1020 may be implemented by using a transceiver 1110, the processing module 1010 may be implemented by using a processor 1120, and the transceiver module may be, for example, an input/output interface, a pin, or a circuit. The processing module may execute a computer-executable instruction stored in a storage unit. The storage unit is a storage unit in the chip, for example, a register or a buffer, or the storage unit may be a storage unit in the second device but outside the chip, for example, a read-only memory (ROM), another type of static storage device that can store static information and an instruction, or a random access memory (RAM).

Optionally, the storage unit is the storage unit in the chip, for example, the register or the buffer, or the storage unit may be the storage unit in the terminal but outside the chip, for example, the read-only memory (ROM), another type of static storage device that can store the static information and an instruction, or the random access memory (RAM). The storage unit is the storage unit in the chip, for example, the register or the buffer, or the storage unit may be the storage unit in the terminal but outside the chip, for example, the read-only memory (ROM), another type of static storage device that can store the static information and an instruction, or the random access memory (RAM).

Figure 12:
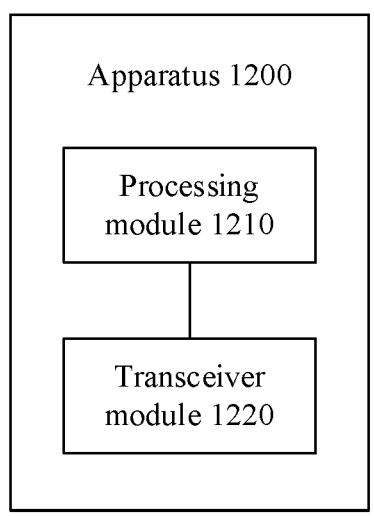
FIG. 12 is a schematic block diagram of a signal transmission apparatus according to another embodiment of this application.

FIG. 12 shows a signal transmission apparatus 1200 according to an embodiment of this application. The signal transmission apparatus 1200 may be the foregoing third device.

The apparatus 1200 includes:

a processing module 1210, configured to determine configuration information, where the configuration information is used to indicate a quantity of times for which the third device sends a signal group, and the signal group includes at least one first signal; and a transceiver module 1220, configured to send the configuration information to a second device, where the second device is a device that currently provides a service for a first device, where the transceiver module 1220 is configured to send the first signal to the first device.

Optionally, the transceiver module 1220 is further configured to receive a configuration request. The transceiver module is specifically configured to send the configuration information based on the configuration request.

Optionally, the transceiver module 1220 is further configured to receive parameter information. The processing module 1210 is specifically configured to determine the configuration information based on the parameter information.

Optionally, the parameter information is used to indicate at least one of: a time-frequency domain resource position occupied by the first signal, the quantity of times for which the third device sends the signal group, and/or a quantity of transmit beams corresponding to first signals.

Optionally, the configuration information is used to indicate at least one of: a quantity of first signals included in the signal group, the time-frequency domain resource position occupied by the first signal, and/or a periodicity in which the signal group is sent once.

Optionally, the time-frequency domain resource position that is occupied by the first signal and that is indicated by the configuration information is different from a time-frequency domain resource position occupied by a second signal, and the second signal is a signal sent by the third device to a terminal device served by the third device.

Optionally, the configuration information is further used to indicate a type of first signal, the type of first signal is a first type or a second type, a first signal of the first type includes a primary synchronization signal, a secondary synchronization signal, and a broadcast signal, and a first signal of the second type includes a primary synchronization signal and a secondary synchronization signal.

Optionally, when the type of first signal is the second type, the first signal occupies at least two time units on a time domain resource, and a time unit occupied by a primary synchronization signal in the first signal and a time unit occupied by a secondary synchronization signal in the first signal are consecutive time units in the at least two time units.

Optionally, the signal transmission apparatus 1200 provided in this embodiment of this application may be the third device, or may be a chip in the third device.

It should be understood that the signal transmission apparatus 1200 according to this embodiment of this application may correspond to the third device in the signal transmission methods in the embodiments of FIG. 4 to FIG. 7. In addition, the foregoing and other management operations and/or functions of the modules in the signal transmission apparatus 1200 are separately used to implement corresponding steps in the foregoing methods. For brevity, details are not described herein again.

Figure 13:
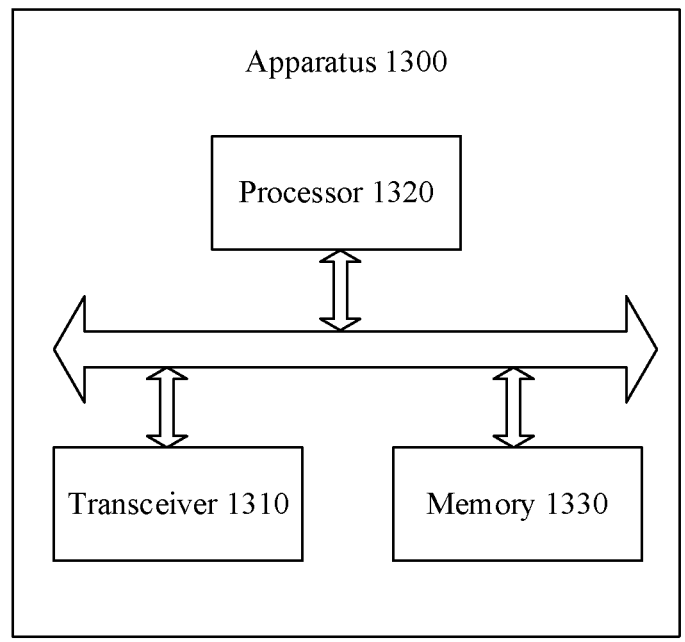
FIG. 13 is a schematic structural diagram of a signal transmission apparatus according to another embodiment of this application.

Optionally, if the signal transmission apparatus 1200 is the third device, in this embodiment of this application, the transceiver module 1220 may be implemented by using a transceiver 1310, and the processing module 1210 may be implemented by using a processor 1320. As shown in FIG. 13, a signal transmission apparatus 1300 may include the transceiver 1310, the processor 1320, and a memory 1330. The memory 1330 may be configured to store indication information, and may be further configured to store code, an instruction, and the like that are executed by the processor 1320. The transceiver 1310 may include a radio frequency circuit. Optionally, the third device further includes a storage unit.

The storage unit may be, for example, a memory. When the third device includes the storage unit, the storage unit is configured to store a computer-executable instruction, the processor is connected to the storage unit, and the processor executes the computer-executable instruction stored in the storage unit, so that the third device performs the foregoing signal transmission methods.

Optionally, if the signal transmission apparatus 1200 is the chip in the third device, the chip includes the processing module 1210 and the transceiver module 1220. The transceiver module 1220 may be implemented by using a transceiver 1310, the processing module 1210 may be implemented by using a processor 1320, and the transceiver module may be, for example, an input/output interface, a pin, or a circuit. The processing module may execute a computer-executable instruction stored in a storage unit. The storage unit is a storage unit in the chip, for example, a register or a buffer, or the storage unit may be a storage unit in the terminal but outside the chip, for example, a read-only memory (ROM), another type of static storage device that can store static information and an instruction, or a random access memory (RAM).

It should be understood that, the processor 920, the processor 1120, or the processor 1320 may be an integrated circuit chip, and has a signal processing capability. In an implementation process, steps in the foregoing method embodiments can be implemented by using a hardware integrated logic circuit in the processor, or by using an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logic block diagrams that are disclosed in the embodiments of this application may be implemented or performed. The general purpose processor may be a microprocessor, or the processor may be any conventional processor or the like. The steps of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory 930, the memory 1130, or the memory 1330 in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that memories in systems and methods described in this specification include but are not limited to these memories and memories of any other proper types.

Figure 14:
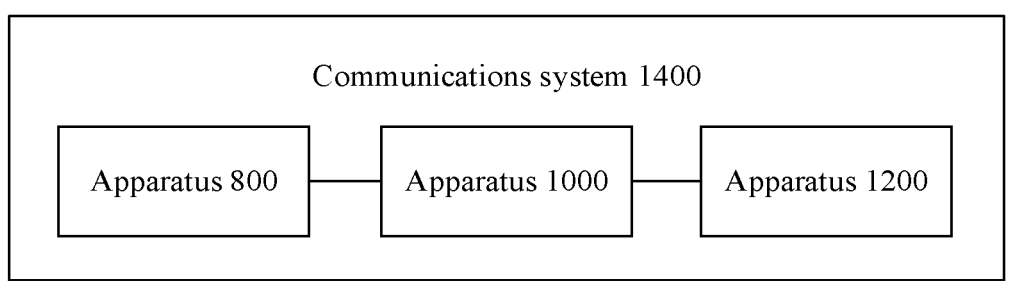
FIG. 14 is a schematic block diagram of a communications system for signal transmission in this application.

FIG. 14 shows a communications system 1400 according to an embodiment of this application, where the communications system 1400 includes:

the signal transmission apparatus 800 in the embodiment shown in FIG. 8, the signal transmission apparatus 1000 in the embodiment shown in FIG. 10, and the signal transmission apparatus 1200 in the embodiment shown in FIG. 12.

This embodiment of this application further provides a computer storage medium, and the computer storage medium may store a program instruction for indicating any one of the foregoing methods.

Optionally, the storage medium may specifically be the memory 930, 1130, or 1330.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, or unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, unit division is merely logic function division and may be other division in actual implementation. For example, a plurality of units or components may be combined or integrated into another system, or some features may be ignored or not performed. In addition, the displayed or discussed mutual coupling, direct coupling, or communication connections may be implemented by using some interfaces. Indirect coupling or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a prior art, or some of the technical solutions may be implemented in a form of a software product. The computer software product is stored in a storage medium, and includes several instructions for instructing a computer device (which may be a personal computer, a server, or a network device) to perform all or some of the steps of the methods according to the embodiments of this application. The foregoing storage medium includes various media that can store program code, for example, a USB flash drive, a removable hard disk, a read-only memory (ROM), a random access memory (RAM), a magnetic disk, and an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    receiving, by a first device, configuration information sent by a second device, wherein the configuration information is used to indicate a quantity of times for which a third device sends a signal group and at least one of:
        a quantity of signals having a first signal comprised in the signal group,
        a time-frequency domain resource position occupied by the first signal, or
        a periodicity in which the signal group is sent once;
    scanning a plurality of receive beams of the first device to determine which of the receive beams align with a transmit beam;
    receiving, by the first device based on the configuration information, the first signal sent by the third device, wherein the first signal is used by the first device to discover or measure the third device; and
    wherein the first signal is received by one of the plurality of receive beams of the first device and the first signal is determined by which of the plurality of receive beams align with the transmit beam that is scannable by the third device.

2. The method according to claim 1, wherein the step of receiving, by the first device, configuration information sent by a second device further comprises:
    receiving, by the first device, the configuration information sent by the second device, wherein the configuration information is triggered by the third device based on a configuration request sent by the second device.

3. The method according to claim 1, further comprising:
    sending, by the first device, parameter information to the second device; and
    the receiving, by the first device, configuration information sent by a second device comprises:
    receiving, by the first device, the configuration information, wherein the configuration information is determined based on the parameter information.

4. The method according to claim 3, wherein the parameter information is used to indicate at least one of the time-frequency domain resource position occupied by the first signal, the quantity of times for which the third device sends the signal group, or a quantity of transmit beams corresponding to the quantity of signals.

5. The method according to claim 1, wherein the time-frequency domain resource position that is occupied by the first signal and that is indicated by the configuration information is different from a time-frequency domain resource position occupied by a second signal, and the second signal is a signal sent by the second device to a terminal device served by the second device.

6. The method according to claim 1, wherein the configuration information is further used to indicate a type of the first signal, wherein the type of the first signal is a first type or a second type, and wherein a first type of the first signal comprises a primary synchronization signal, a secondary synchronization signal, and a broadcast signal, and a second type of the first signal comprises the primary synchronization signal and the secondary synchronization signal.

7. The method according to claim 6, wherein when the type of the first signal is the second type, the first signal occupies at least two time units on a time domain resource, and a time unit occupied by the primary synchronization signal in the first signal and a time unit occupied by the secondary synchronization signal in the first signal are consecutive time units in the at least two time units.

8. A method, comprising:
    obtaining, by a second device, configuration information, wherein the configuration information is used to indicate a quantity of times for which a third device sends a signal group, and at least one of:
        a quantity of signals having a first signal comprised in the signal group,
        a time-frequency domain resource position occupied by the first signal, or
        a periodicity in which the signal group is sent once;
    sending, by the second device, the configuration information to a first device, wherein the first device receives the first signal based on the configuration information, and wherein the first signal is used by the first device to discover or measure the third device; and
    wherein the first signal is received by one of a plurality of receive beams of the first device and the first signal is determined by which of the plurality of receive beams align with a transmit beam that is scannable by the third device.

9. The method according to claim 8, further comprising:
    sending, by the second device, a configuration request to the third device; and
    the obtaining, by the second device, configuration information comprises:
    receiving, by the second device, the configuration information sent by the third device, wherein the configuration information is triggered by using the configuration request.

10. The method according to claim 8, further comprising:
    receiving, by the second device, parameter information sent by the first device; and
    sending, by the second device, the parameter information to the third device; and the obtaining, by the second device, configuration information comprises:
receiving, by the second device, the configuration information sent by the third device, wherein the configuration information is determined based on the parameter information.

11. The method according to claim 10, wherein the parameter information is used to indicate at least one of the time-frequency domain resource position occupied by the first signal, the quantity of times for which the third device sends the signal group, or a quantity of transmit beams corresponding to the quantity of signals.

12. The method according to claim 8, wherein the time-frequency domain resource position that is occupied by the first signal and that is indicated by the configuration information is different from a time-frequency domain resource position occupied by a second signal, and the second signal is a signal sent by the third device to a terminal device served by the third device.

13. The method according to claim 8, wherein the configuration information is further used to indicate a type of the first signal, wherein the type of the first signal is a first type or a second type, and wherein a first type of the first signal comprises a primary synchronization signal, a secondary synchronization signal, and a broadcast signal, and a second type of the first signal comprises the primary synchronization signal and the secondary synchronization signal.

14. The method according to claim 13, wherein when the type of the first signal is the second type, the first signal occupies at least two time units on a time domain resource, and a time unit occupied by the primary synchronization signal in the first signal and a time unit occupied by the secondary synchronization signal in the first signal are consecutive time units in the at least two time units.

15. An apparatus comprising:
a transceiver, configured to receive configuration information sent by a second device, wherein the configuration information is used to indicate a quantity of times for which a third device sends a signal group, and at least one of:
a quantity of signals having a first signal comprised in the signal group,
a time-frequency domain resource position occupied by the first signal,
or a periodicity in which the signal group is sent once;
wherein the first signal is received by one of a plurality of receive beams of the first device and the first signal is determined by which of the plurality of receive beams align with a transmit beam that can be scanned by the third device; and
a processor, configured to:

scan the plurality of receive beams of the first device to determine which of the receive beams align with the transmit beam; and
receive, based on the configuration information, the first signal sent by the third device, wherein the first signal is used by the first device to discover or measure the third device.

16. The apparatus according to claim 15, wherein the transceiver is further configured to receive the configuration information sent by the second device, wherein the configuration information is triggered by the third device based on a configuration request sent by the second device.

17. The apparatus according to claim 15, wherein the transceiver is further configured to send parameter information to the second device and the transceiver is further configured to receive the configuration information, wherein the configuration information is determined based on the parameter information.

18. An apparatus comprising:
a processor, configured to obtain configuration information, wherein the configuration information is used to indicate a quantity of times for which a third device sends a signal group, and at least one of:
a quantity of signals having a first signal comprised in the signal group,
a time-frequency domain resource position occupied by the first signal,
or a periodicity in which the signal group is sent once; and
a transceiver, configured to send the configuration information to a first device, wherein the configuration information determines how the first device receives the first signal;
wherein the first signal is used by the first device to discover or measure the third device; and
wherein the first signal is received by one of a plurality of receive beams of the first device and the first signal is determined by which of the plurality of receive beams align with a transmit beam that is scannable by the third device.

19. The apparatus according to claim 18, wherein the transceiver is further configured to:
send a configuration request to the third device; and
receive the configuration information sent by the third device, wherein the configuration information is triggered by using the configuration request.

20. The apparatus according to claim 18, wherein the transceiver is further configured to:
receive parameter information sent by the first device;
send the parameter information to the third device; and
receive the configuration information sent by the third device, wherein the configuration information is determined based on the parameter information.

* * * * *